Feb. 28, 1961 F. E. HALSTEAD 2,973,397
THERMOCOUPLE APPARATUS AND METHOD OF USING THE SAME
Filed Oct. 17, 1957
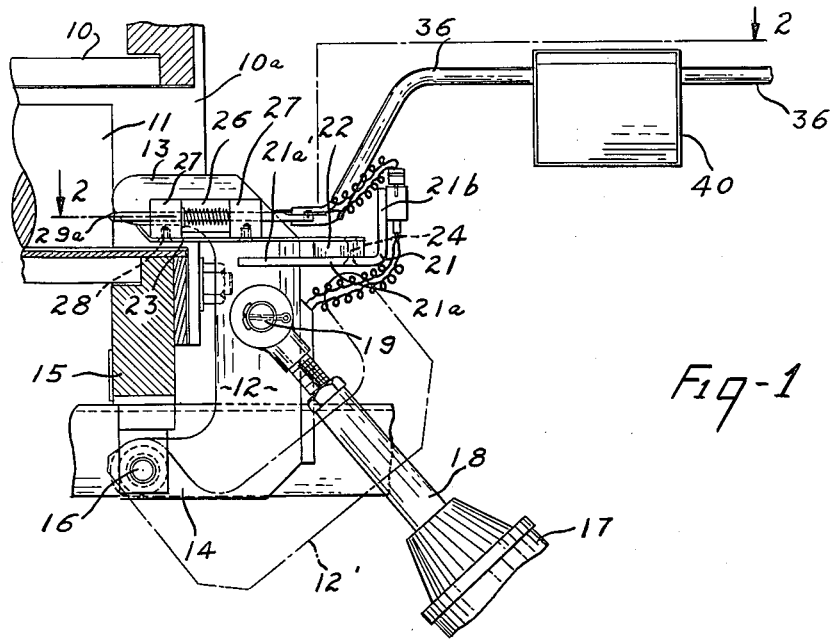
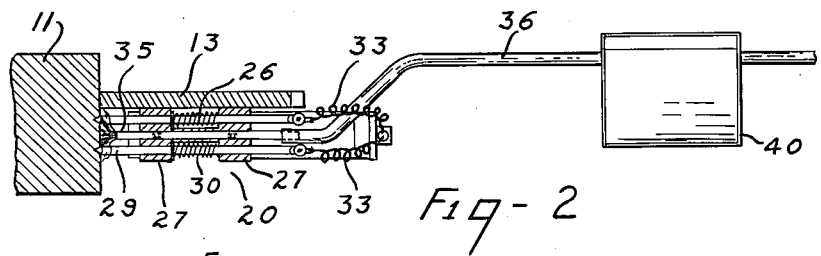
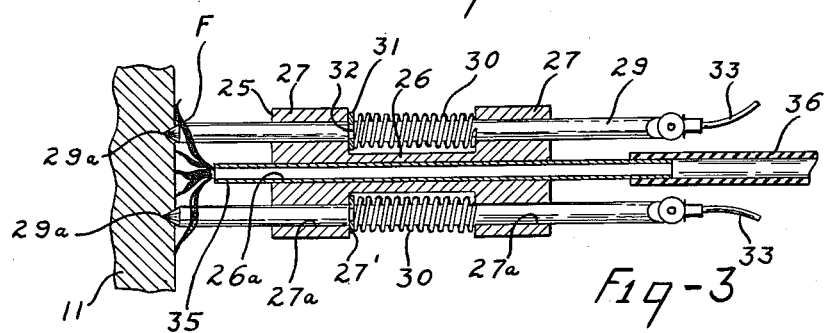
INVENTOR.
Fred E. Halstead
BY
Slough & Slough Patented Feb. 28, 1961

2,973,397

THERMOCOUPLE APPARATUS AND METHOD OF USING THE SAME

Fred E. Halstead, Zelienople, Pa., assignor to Ajax Magnethermic Corporation, a corporation of Ohio Filed Oct. 17, 1957, Ser. No. 690,823

4 Claims. (Cl. 136—4)

My invention relates to induction heating furnaces for heating metal billets and particularly to an improved thermocouple for determining the temperature of a billet while it is being heated.

One of the problems which is frequently encountered in using a thermocouple is scale formation. Scale forms on the thermocouple point at high temperatures due to oxidation, and an imperfect electrical contact is made resulting in a false reading. Additionally, at these extreme temperatures, the billets themselves tend to oxidize causing scale formation which is troublesome to the operation of the furnace.

It is an object of the present invention to provide an improved thermocouple which will maintain perfect electrical contact with the billet.

Another object of my invention is to provide a simple means for effectively preventing scale formation on either the billet contacting surface or the thermocouple points.

Still another object of my invention is to provide a thermocouple as described above whereby the means for eliminating scale formation can be incorporated in a thermocouple with a minimum modification of the mechanism.

Other objects of my invention and the invention itself will be readily understood from the following description and the appended drawings.

In the drawings:

Fig. 1 is a side plan view of the improved thermocouple mounted upon an induction furnace;

Fig. 2 is a section taken along the line 2—2 of Fig. 1; and

Fig. 3 is similar to Fig. 2 showing an enlarged, detailed view of the thermocouple of Figs. 1 and 2.

The improved thermocouple of my invention as hereinn illustrated and disclosed comprises, in general, a pair of thermocouple prods and a gas outlet nozzle unitarily mounted in association with an induction heating furnace. The prods are adapted to be brought into contact with a billet while it is being heated to determine the temperature thereof and are operable in accordance with well-known thermocouple principles. The gas outlet nozzle is adapted to envelop the points of the prods and the general contact area of the billet in a flame for purposes to be herein later more fully discussed.

Referring now to the drawings in all of which like parts are designated by like reference characters, and particularly to Fig. 1, at 10 I show an induction heating, inductor coil furnace having a billet 11 contained therein for the purpose of heating. At 12 I provide a billet stop having right angularly projecting, parallel arms, an uppermost stop arm 13 and a relatively lowermost pivot arm 14. The billet stop 12 is pivoted to a frame member 15 of the furnace 10 by means of a shaft 16 suitably mounted upon said frame below said furnace.

The billet stop 12 pivots upwardly upon the shaft 16 whereby the stop arm 13 projects into the open mouth 10a of the furnace 10 to retain the billet 11 therein. Said billet stop is actuated preferably by means of a fluid-operated cylinder 17 having a piston rod 18 extending outwardly from one end thereof and suitably pivoted to said billet stop at 19. In the dotted line showing designated 12', the billet stop is shown in a downwardly pivoted position whereby the stop arm 13 is retracted from the furnace 10 to allow removal of the billet 11.

The thermocouple of my invention, indicated by the number 20, is mounted upon the billet stop 12 by means of an L-shaped bracket 21. The bracket 21 is formed of relatively heavy, flat, sheet metal having a horizontally disposed leg 21a and a vertically upstanding support 21b. Said bracket is welded or otherwise suitably secured to the billet stop 12 at its inwardly directed end 21a', the lateral edge of said end being secured to a lateral surface of said billet stop. The bracket 21 extends outwardly beyond the billet stop 12 and has mounted thereupon a spacer 22 and an inwardly cantilevered flat spring 23. The bracket 21, the spacer 22, and the spring 23 are integrally secured together in any suitable manner as by rivets 24.

The spring 23 projects inwardly adjacent the stop arm 13 and provides a resilient mounting means for the thermocouple 20. Said thermocouple comprises a holder in the form of an H-shaped casting 25 having a narrow central body portion 26 and relatively wider end portions 27. Said casting is secured to the flat spring 23 at its innermost end by means of upwardly directed screws 28.

Referring now particularly to Fig. 3, the end portions 27 are horizontally apertured at 27a, thereby providing two pairs of coaxial openings, the axes of whcih are parallel to the axis of the furnace 10. A pair of thermocouple prods 29 are telescopically interfitted with the pairs of coaxial apertures 27a, said prods being positioned laterally on either side of the central body 26 and extending in either axial direction beyond the casting 25.

A pair of coil springs 30 are telescoped upon the prods 29 and interposed between the end portion 27 of the casting 25. Snap rings 31 are attached to the prods 29 by means of circumferential grooves 32, said rings abutting the outwardly directed surface 27' of the innermost end portion 27 and the innermost ends of the springs 30. The prods 29 slidably interfit the apertures 27a, and it will be readily understood that by means of the springs 30 and the snap rings 31, said prods are resiliently biased in an inward direction toward the billet 11.

It will be noted that the points 29a of the prods 29 extend inwardly beyond the stop arm 13. When the billet 11 is thrust against said stop arm, the prod points 29a are biased against the billet 11 with enough force to slightly penetrate the surface thereof.

The central body portion 26 is longitudinally apertured at 26a to provide mounting means for a preferably tightly interfitting nozzle 35 manufactured of copper tubing or the like. The nozzle 35 extends longitudinally in either direction beyond the casing 25, the innermost end of said nozzle being spaced outwardly from the plane of the thermocouple prod points 29a. When the points 29a contact the billet 11 and the springs 30 are fully extended, the end of said nozzle is preferably spaced about ½ inch from said billet. A flexible gas line 36 is suitably connected to the nozzle 35 adjacent its outwardly directed end whereby a combustible gas is directed to said nozzle to be ignited at the inner end thereof. Electrical wires 33 are connected to the outer ends of the prods 29 to provide an electrical circuit for operation of the thermocouple in a well-known manner.

As herein illustrated and described the nozzle 35 is preferably unitarily mounted with the thermocouple 20 between the prods 29. Said nozzle may, however, be mounted separately from said thermocouple, such as to one side or the other, provided the flame F envelops the area of contact between the prods 29 and the billet 11.

Referring now to Figs. 1 and 2, at 40 I show in diagrammatic form the interposition in the gas line 36 of an apparatus for the entrainment of a fluxing compound in the combustible gas to be delivered to the nozzle. The type of apparatus to which I refer is a well-known commercial device, adapted to entrain fluxes in a gaseous medium to be burned, said fluxes being of a type disclosed in United States Letters Patent No. 2,281,910 dated May 5, 1942 issued to Bialosky and Merlub-Sobel, and United States Letters Patent No. 2,277,064 dated March 24, 1942, issued to the same inventors. The above-mentioned apparatus and fluxes are given here as an example only of the type of device and materials which may be used with my improved thermocouple, it being understood that any device for so entraining any suitable flux in the gas could be used.

The purpose of introducing the flux into the gaseous medium is to prevent the scale formation, hereinbefore referred to, which tends to form on billets and thermocouple prod points at high temperature and to aid in dissolving any scale which may be present on the billet prior to the heating operation. A flux which I have found to be effective is a methyl-borate azeotrope mixed with approximately 20 percent acetone. According to well-known chemical principles, the borate reacts in the flame to produce boric oxide which dissolves the scale.

By referring to Fig. 3, it will be noted that the flame F at the end of the nozzle 35, due to its proximity to the billet 11, is spread radially outwardly to envelop the thermocouple prods 29 and covers a substantial area of said billet. Scale formation and accumulation is, therefore, prevented on the thermocouple points and the contacting area of the billet and a perfect electrical circuit results.

Any available fuel gas may be used for the entrainment of the flux, such as acetylene, propane, natural gas, or possibly a hydrogen mixture. The present inventor has obtained excellent results with the use of natural gas.

Whereas it might appear that the presence of the flame F in the area of the thermocouple prod points 29a and the billet 11 would tend to affect the temperature reading, I have found by extensive experimentation that this is not true and that extremely accurate readings are possible with my device.

It will be understood that many departures from the details of my invention as it is herein described and illustrated may be made, such as changes in size and dimension, without, however, departing from the spirit of my invention or the scope of the appended claims.

What I claim is:

1. A thermocouple for determining the temperature of a heated billet comprising a holder, a pair of thermocouple prods resiliently mounted in said holder, said prods having contact points, a nozzle mounted in said holder having its open end adjacent said contact points, a gas line connected to said nozzle, means for entraining a flux into gas carried by said line, said nozzle delivering a gaseous medium having a flux entrained therein, said medium being burned in the area of said contact points and preventing scale formation on said points, and means moving said holder whereby said prods contact a billet.

2. A thermocouple for determining the temperature of a heated billet to an induction heating furnace, said thermocouple comprising a holder, a pair of prods mounted in said holder, said prods having contact points, spring means associated with said holder and said prods whereby said prods are biased in one longitudinal direction relative to said holder, said prods having means limiting the movement thereof in reaction to said spring means, a nozzle rigidly mounted in said holder between said prods, a gas line connected to said nozzle, means for entraining a flux into gas carried by said line, said nozzle delivering a jet of burning gas in the area of said contact points, said gas having a fluxing compound extrained therein of the type for dissolving oxidation on heated metal surfaces.

3. A method of obtaining perfect electrical contact between a pair of thermocouple prods and a billet heated to a temperature whereby said prods are subject to the scaling effect of oxidation, said method comprising the delivery of a combustible gas having a fluxing compound entrained therein to the area of thermocouple contact and burning said gas in said area prior to billet contact thereby preventing said scale, the prods then contacting said billet.

4. A thermocouple for determining the temperature of a heated billet comprising a holder, a movable billet stop, said holder mounted upon said movable stop, a pair of thermocouple prods resiliently mounted in said holder, said prods having contact points, a nozzle mounted in said holder having its open end adjacent said contact points, a gas line connected to said nozzle, means for entraining a flux into gas carried by said line, said nozzle delivering a gaseous medium having a flux entrained therein, said medium being burned in the area of said contact points and preventing scale formation on said points, means moving said holder whereby said prods contact a billet, said holder being movable by the movement of said stop means whereby said prods are adapted to be moved into and out of contact with said billet and said burning medium is adapted to envelop the ends of the prods and the ends of the billet prior to contact.

References Cited in the file of this patent

UNITED STATES PATENTS

| | | |
|---|---|---|
| 2,466,137 | Vollrath | Apr. 5, 1949 |
| 2,493,078 | Mead | Jan. 3, 1950 |
| 2,694,313 | Neiman | Nov. 16, 1954 |
| 2,703,495 | Benninghoff | Mar. 8, 1955 |
| 2,750,791 | Hanysz et al. | June 19, 1956 |
| 2,779,810 | Horbinski | Jan. 29, 1957 |

UNITED STATES PATENT OFFICE

CERTIFICATION OF CORRECTION

Patent No. 2,973,397                          February 28, 1961

Fred E. Halstead

It is hereby certified that error appears in the above numbered patent requiring correction and that the said Letters Patent should read as corrected below.

Column 4, lines 20 and 21, for "extrained" read -- entrained --.

Signed and sealed this 11th day of July 1961.

(SEAL)
Attest:

ERNEST W. SWIDER                              DAVID L. LADD

Attesting Officer                                 Commissioner of Patents